(12) United States Patent
Brandwine et al.

(10) Patent No.: US 10,027,678 B1
(45) Date of Patent: Jul. 17, 2018

(54) LOCATION-AWARE SECURITY CONFIGURATION OF PERIPHERAL DEVICES

(71) Applicant: Amazon Technologies, Inc., Seattle, WA (US)

(72) Inventors: Eric Jason Brandwine, Haymarket, VA (US); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/084,367

(22) Filed: Mar. 29, 2016

(51) Int. Cl.
| | |
|---|---|
| *G06F 21/62* | (2013.01) |
| *H04L 29/06* | (2006.01) |
| *G06F 13/42* | (2006.01) |
| *G06F 13/40* | (2006.01) |
| *G06F 11/30* | (2006.01) |
| *G06F 11/22* | (2006.01) |
| *G06F 9/4401* | (2018.01) |

(52) U.S. Cl.
CPC ......... *H04L 63/107* (2013.01); *G06F 9/4415* (2013.01); *G06F 11/2247* (2013.01); *G06F 11/3051* (2013.01); *G06F 13/4022* (2013.01); *G06F 13/4282* (2013.01)

(58) Field of Classification Search
CPC .. G06F 2221/2113; G06F 21/56; G06F 21/62; G06F 21/71; G06F 21/577; G06F 21/31; G06F 21/32; G06F 2221/2111; G06F 21/606; G06F 21/64; G06F 21/70; H04L 63/107; H04W 12/06; H04W 12/08; H04W 4/02; H04W 88/02
See application file for complete search history.

(56) References Cited

U.S. PATENT DOCUMENTS

| | | | |
|---|---|---|---|
| 8,490,206 B1 * | 7/2013 | Fish ................... | G06F 17/3089 726/30 |
| 2004/0030912 A1 | 2/2004 | Merkle, Jr. et al. | |

(Continued)

OTHER PUBLICATIONS

U.S. Appl. No. 15/084,251, filed Mar. 29, 2016, Titled: Examining Local Hardware Using a Location-Aware Peripheral Device.

*Primary Examiner* — Ernest Unelus
(74) *Attorney, Agent, or Firm* — Kilpatrick Townsend & Stockton LLP

(57) ABSTRACT

Provided are systems and methods for location-aware security configuration of peripheral devices. In various implementations, a location-aware peripheral device comprises an interface and a configuration engine. The interface may communicatively couple the peripheral device to a computing system. The configuration engine may be configured to, upon powering on in the computing system, detect a characteristic of the computing system. In some implementations, the configuration engine may further select a trust level for the computing system. In some implementations, selecting a trust level may include using the detected characteristic to identify a profile stored on the peripheral device. The profile may describe a pre-determined computing system. The configuration engine may further be configured to program the peripheral device with a configuration that is associated with the selected trust level. The configuration may program a feature of the peripheral device.

25 Claims, 8 Drawing Sheets

(56) References Cited

U.S. PATENT DOCUMENTS

| | | | |
|---|---|---|---|
| 2012/0239950 A1* | 9/2012 | Davis | H04W 12/06 713/320 |
| 2013/0139262 A1* | 5/2013 | Glew | H04L 63/1466 726/23 |
| 2016/0378509 A1 | 12/2016 | Venkatasubba et al. | |

* cited by examiner

LOCATION-AWARE SECURITY CONFIGURATION OF PERIPHERAL DEVICES

BACKGROUND

Computing systems may include peripheral devices. Peripheral devices may add to or change the functionality of the computing system. In many cases, peripheral devices are connected to the computing system using an interconnect. The interconnect may implement a standard bus protocol, such as any of the Peripheral Component Interconnect (PCI) family of bus protocols.

Peripheral devices may be used with a variety of computing systems, operating in a variety of environments, including network environments. In some cases, the computing system and/or its surrounding environment may be highly trusted and very secure. A carefully architected and closely monitored datacenter is one example of an environment that may be highly trusted. In other cases, the computing system and/or its environment may be moderately trusted. A computing system in a private home or located at a school or in a public library is an example of a computing system that may be moderately trusted. In yet other cases, the computing system and/or its environment may be untrusted. A computing system that has been stolen is one example of a computing system that may be untrusted.

BRIEF DESCRIPTION OF THE DRAWINGS

Various embodiments in accordance with the present disclosure will be described with reference to the drawings, in which.

DETAILED DESCRIPTION

Figure 1:
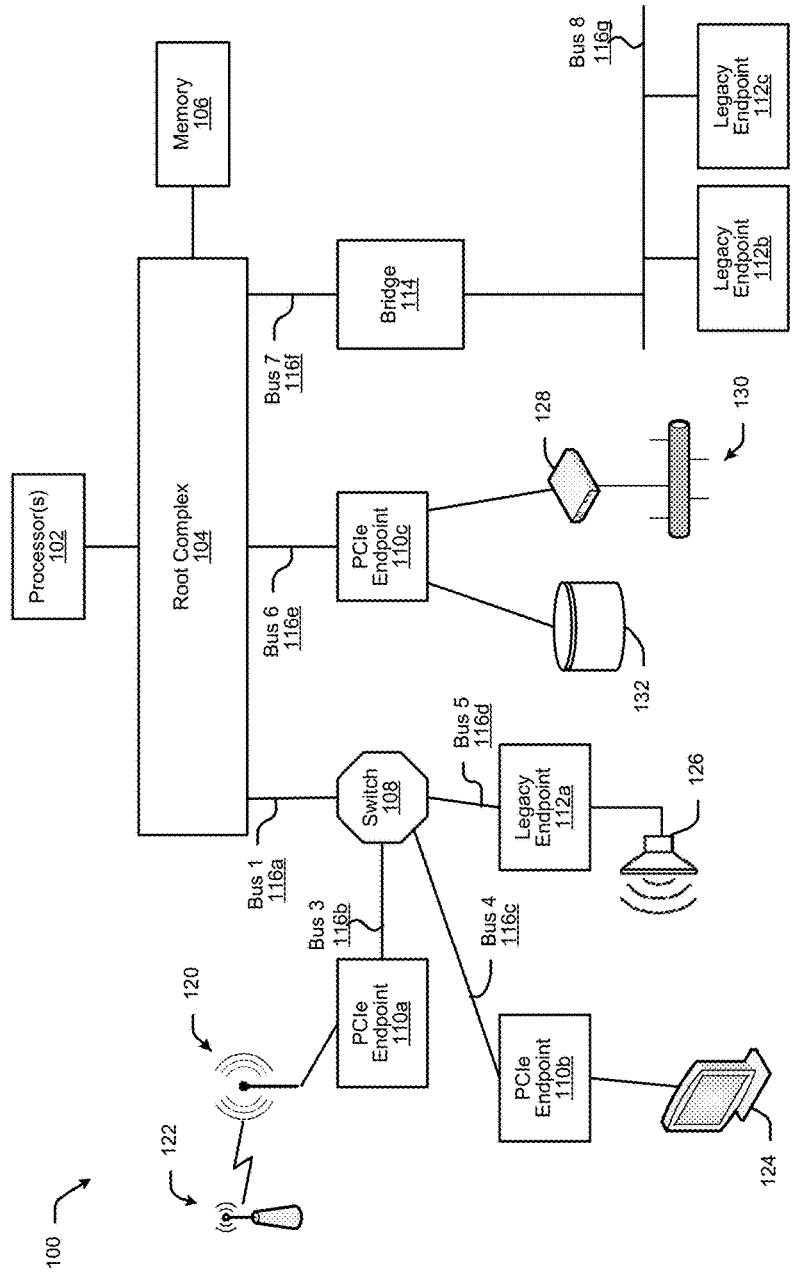
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include peripheral devices. Peripheral devices may add to or change the functionality of the computing system. Examples of peripheral devices include storage devices, displays, speakers, and wired and/or wireless network adapters, among others. In many cases, peripheral devices are connected to the computing system using an interconnect. The interconnect may implement a standard bus protocol, such as any of the PCI family of bus protocols. Transactions transferred over the interconnect typically include at least an address, designating a destination for the transaction. Write transactions may also include data to write to the address.

A peripheral device can be implemented with a range of intelligence. For example, the peripheral device may provide a network interface and a storage device. The peripheral device's network interface may further provide network traffic monitoring, including per-user bandwidth monitoring and throttling. The network interface may further disable any authentication requirements for accessing the computing system that it is attached to, or for accessing the storage device functionality of the peripheral device. These example features of the peripheral device may be desirable in some environments, but may not be desirable in others. For example, the functionality described in this example may only be appropriate in a highly trusted environment. In a less trusted environment, it may be that the peripheral device should only provide a storage device, while in other less trusted environments the peripheral device should only provide a network interface, with authentication requirements. In untrusted environments, such as for example when the peripheral device has been stolen, it may be that the peripheral device should disable itself.

In various implementations, a peripheral device can be location-aware and self-configuring. A location-aware peripheral device can investigate and determine characteristics of the computing system that it has been attached to, and thereby attempt to establish its location. Having established its location, the location-aware peripheral device can self-configure to enable a set of features from among its available features. In some cases, the peripheral device may enable all of its features, such as for instance when the peripheral device recognizes that it is in a highly trusted environment. In other cases, the peripheral device may only enable a minimum set of features, such as for instance when the peripheral device establishes that it is on a moderately trusted environment. In yet other cases, the peripheral device may disable itself, either temporarily or permanently, such as when it finds itself in an untrusted environment.

In various implementations, a location-aware, self-configuring peripheral device (which may also be referred to more briefly as a location-aware peripheral device) can establish a trust level by probing its environment. In some implementations, upon powering on in a computing system, the peripheral device may use its interconnect to determine the characteristics of the environment that is internal to the computing system. In some implementations, the peripheral device may send packets to a network that the computing is system is connected to, to learn characteristics external to the computing system. The peripheral device may further be pre-configured with profiles of various computing systems. The peripheral device may use the characteristics it has determined for the computing system to identify a profile from among stored profiles. Based on the comparison result, the peripheral device may select a trust level for the computing system. Having selected a trust level, the peripheral device may then configure itself to enable features consistent with the trust level.

In various implementations, a location-aware, self-configuring peripheral device can configure itself according to identification information stored on the peripheral device. For example, the peripheral device may be configured to store the characteristics of the first computing system in which it boots after having left the factory. Every time the peripheral device boots again, it may verify that it is still in the same computing system. Should the peripheral device find itself in a different computing system, the peripheral device may enable a different set of features, or may disable itself.

A location-aware, self-configuring peripheral device may thus provide a single device with multiple applications. For example, instead of having one peripheral device for trusted environments and a different device for less trusted environments, a manufacturer can provide a single device for both environments. Furthermore, a location-aware, self-configuring peripheral device that is able to recognize untrusted environments can provide threat detection and/or theft deterrence.

FIG. 1 illustrates an example of a computing system 100 that includes multiple peripheral devices. Peripheral devices may include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 112a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors and memory.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 110a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112b-c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 1101-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-b and the legacy endpoint 112a are also connected to the switch 108a with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 108 (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116e, while the connection between the root complex and the bridge 114 may be labeled Bus 7 116f. Finally, the shared bus downstream from the bridge 114 may be labeled Bus 8 116g. In most cases the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116e, 116f connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116g; however, the bridge 114 may translate the scanning instructions to the protocol implemented by Bus 8 116g.

While scanning the busses, or possibly after, the processors 102 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

I. Location-Aware Security Configuration

Figure 2:
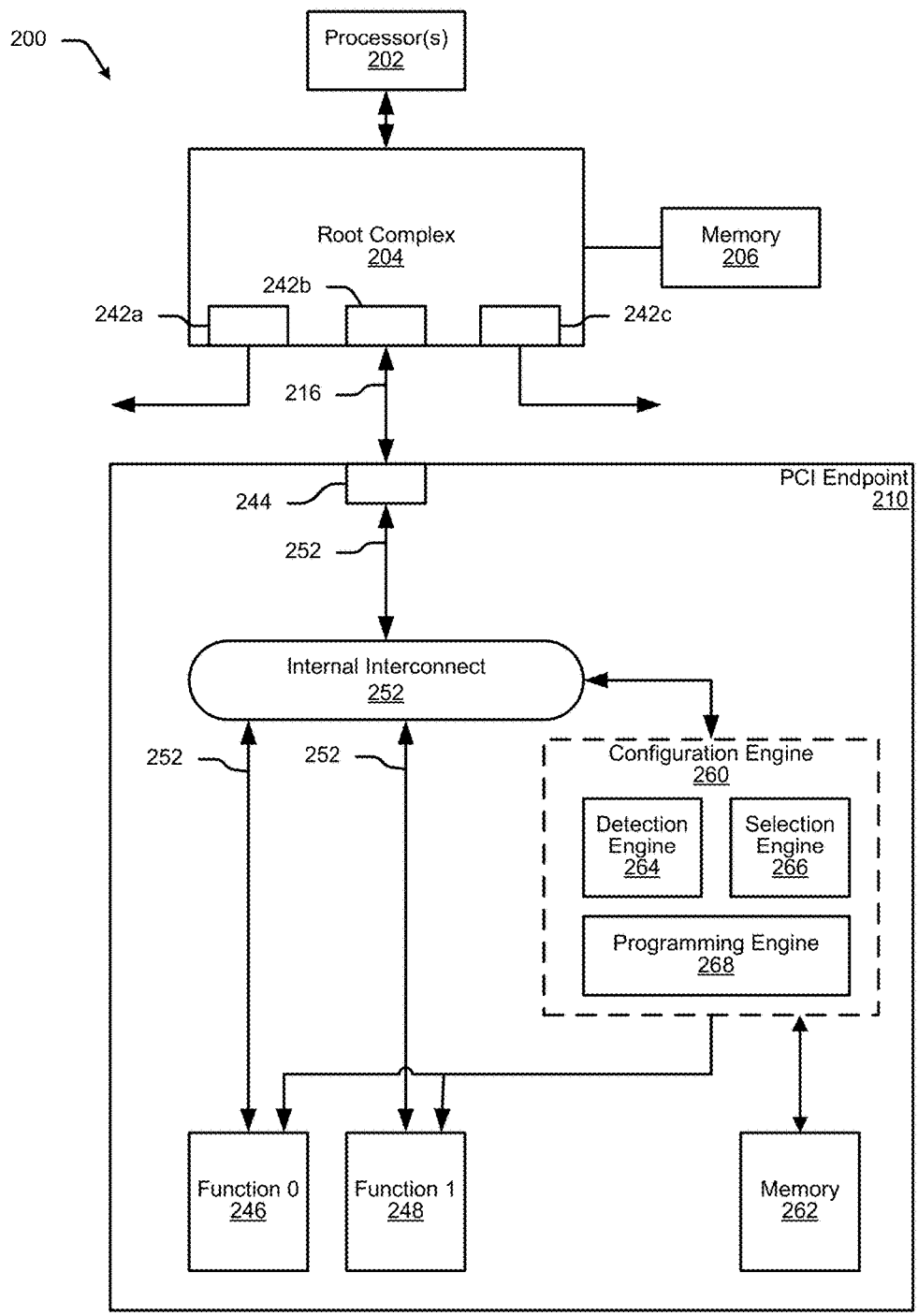
FIG. 2 illustrates an example of a computing system including at least one PCI endpoint, which is also an example of a peripheral device that can be implemented as a location-aware, self-configuring peripheral device.

FIG. 2 illustrates an example of a computing system 200 including at least one PCI endpoint 210. The PCI endpoint 210 is also an example of a peripheral device that can be implemented as a location-aware, self-configuring peripheral device. In this example, the PCI endpoint 210 is in communication with a root complex 204 over a PCI interconnect 216. The root complex 204 may be in communication with one or more processors 202 and a memory subsystem 206. The root complex 204 may include one or more ports 242a-c. These ports 242a-c may be connected, using additional PCI interconnects, to PCI switches, bridges, and endpoints, including the illustrated PCI endpoint 210. The root complex 204 may route transactions between the processors 202 and any of the endpoints, switches, or bridges, or between the endpoints, switches, and bridges themselves. In this example, PCI is used as an example of a bus protocol that may be implemented by the computing system 200 to connect to peripheral devices. In various implementations, the computing system 200 can alternatively or additionally connect to peripheral devices using other bus protocols, such as SCSI, SATA, or PATA, among others, or a combination of different bus protocols including PCI.

The processors 202 may be general purpose computing devices that are generally capable of executing software code. A processor may include multiple processing cores. The memory subsystem 206 provides temporary or long-term storage for data that may be used by the computing system 200.

The PCI endpoint 210 in this example includes a port 244, two functions 246, 248, and an internal interconnect 252 that connects the functions 246, 248 to the port 244. The PCI endpoint 210 may also include an optional configuration engine 260.

The port 244 may include a physical interface for connecting to a cable, socket, port, or other connection to the PCI interconnect 216. The port 244 may further include hardware and/or software to manage incoming and outgoing transactions. The port 244 may translate an internal transaction from the functions 246, 248 into a PCI transaction for transmission over the PCI interconnect 216. The port 244 may further translate transactions received over the PCI interconnect 216 for transfer over the internal interconnect 252 to the functions 246, 248.

The PCI endpoint 210 in this example includes two functions 246, 248. The functions 246, 248 may include hardware and/or software that provide a service for the peripheral device. A service in this context describes the operations and capabilities of the PCI endpoint 210, and the functionality that the PCI endpoint 210 provides to the computing system 200. For example, in cases where the PCI endpoint 210 is a mass storage controller, Function 0 246 may include the hardware and/or software to provide a hard drive, such as for example a Solid State Drive (SSD). As another example, in cases where the PCI endpoint 210 is also a network interface, Function 1 248 may include the hardware and/or software to provide a network interface, including ports for connecting Category-5 (CAT-5) cables, and/or antennas for connecting wirelessly to a network. Two functions are provided as an example. In various implementations, a PCI endpoint may include only one function, or more than two functions. A PCI endpoint that includes more than one function may be referred to as a multi-function device.

The functions 246, 248 may communicate with the port 244 over an internal interconnect 252. The internal interconnect 252 may be implemented using a standard bus protocol, such as Coherent Hub Interface (CHI), Advanced eXtensible Interface (AXI), Advanced High-Performance Bus (AHB), or the like. The internal interconnect 252 may also be implemented using a proprietary bus protocol. The protocols implemented by the internal interconnect 252 typically define a transaction format for transactions sent across the internal interconnect 252. A transaction format typically includes at least an address, indicating the target of the transaction, and a transaction type, such as read or write. Write transactions may further include data. A transaction may include other information that either further identifies the target of the transaction, and/or provides further details about a data read or data write.

In some implementations, the PCI endpoint 210 may include a configuration engine 260. The configuration engine 260 may monitor inbound transactions, such as configuration read and write transactions. The configuration engine 260 may detect configuration information provided to the PCI endpoint 210. In some cases, the configuration engine 260 may use the detected configuration information to configure one or both of the functions 246, 248. In some cases, the configuration engine 260 may provide configuration information. For example, the configuration engine 260 may respond to configuration reads directed to one of the functions 246, 248 and provide the requested information, or may provide alternate information.

In some implementations, the configuration engine 260 may provide location-awareness and self-configuration functionality to the peripheral device. For example, in some implementations, the configuration engine 260 may include a detection engine 264, a selection engine 266, and a programming engine 268. In various implementations, the detection engine 264 may be configured to detect the characteristics of the computing system 200. As explained in further detail below, the detection engine 264 may detect characteristics either internal to or external to the computing system 200, or both.

In some implementations, the selection engine 266 may use the determined characteristics to select a trust level for the computing system. To select a trust level, the selection engine 266 may use the characteristics detected by the detection engine 264 to identify a profile from among profiles stored in the memory 262. For example, the selection engine 266 may operate on one or more of the characteristics using mathematical and/or logical operations, and use the result to identify a profile. As another example, the selection engine 266 may compare one or more of the characteristics against the stored profiles, and identify a profile that is the best or nearest match. In some implementations, the selection engine 266 may use the determined characteristics to determine an identity of the computing system 200. The identity may be included in profiles stored in the memory 262.

The programming engine 268 may configure the PCI endpoint 210 according to the selected trust level and/or the determined identity of the computing system. For example, the programming engine 268 may disable one or both of the functions 246, 248. The functions 246, 248 may, for example, include configuration register that, when written to, disables the function 246, 248. When the functions 246, 248 are enabled, the programming engine 268 may configure the functions 246, 248. For example, the programming engine 268 may program which capabilities each function 246, 248 is to provide. The configuration used by the programming engine 268 may be stored in the memory 262.

Each of the detection engine 264, selection engine 266, and programming engine 268 can be implemented as individual integrated circuits, or in a combined, single integrated circuit. Alternatively or additionally, one or more of the engines 264, 266, 268 may be implemented in firmware, and the configuration engine 260 may include an integrated circuit for executing the firmware. Alternatively or additionally, one or more of the engines 264, 266, 268 may be implemented in a combination of hardware and firmware.

In some implementations, the configuration engine 260 may also include an identification engine (not illustrated). The identification engine may use the characteristics detected by the detection engine to establish an identity of the computing system 200. The identification engine may use the detected characteristics to identify a profile stored in the PCI endpoint's memory 262. As discussed further below, the profiles may include identification information. The identification engine may be implemented as an integrated circuit, or as firmware, or in a combination of circuitry and firmware.

Figure 3:
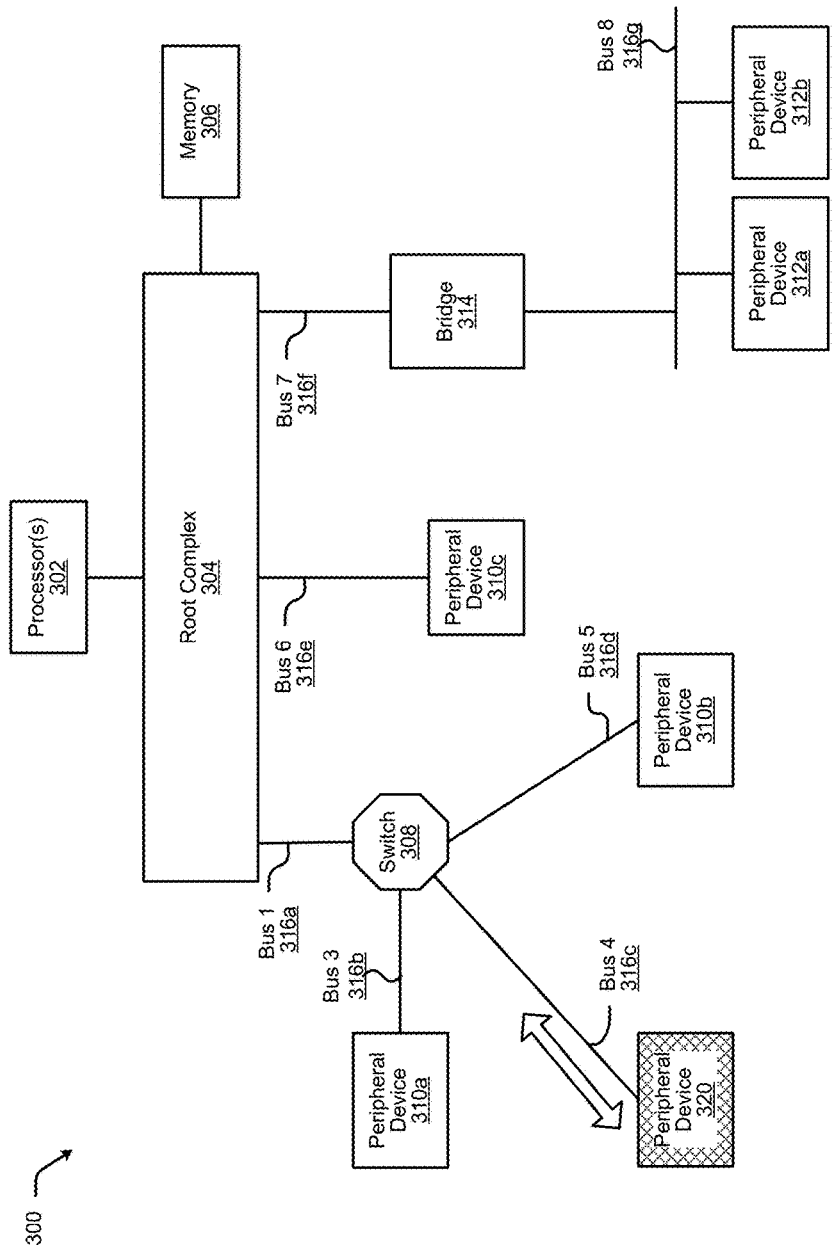
FIG. 3 illustrates one example of an internal configuration of a computing system, where the computing system includes a location-aware, self-configuring peripheral device.

FIG. 3 illustrates one example of an internal configuration of a computing system 300, where the computing system includes a location-aware, self-configuring peripheral device 320, similar to the PCI endpoint 210 described above. In FIG. 3, the example computing system 300 includes one or more processors 302, a root complex 304, a memory subsystem 306, a switch 308, a bridge 314, and a number of peripheral devices 310a-c, 312a-b, including the location-aware, self-configuring peripheral device 320. The processors 302 may be general purpose computing devices, and are generally capable of executing software code. A processor may include multiple processing cores. The root complex 304 may be a hardware and/or software device that connects the processors 302 and the memory subsystem 306 to the peripheral devices 310a-c, 312a-b, 320. The root complex 304 may direct transactions between its various ports, and/or between the ports and the processors 302. The memory subsystem 306 may provide temporary or long-term storage for data that may be used by the computing system 300. The memory subsystem 306 may include volatile and/or non-volatile memory. The peripheral devices 310a-c, 312a-b, 320 may provide the computing system 300 with various functionality, such as displaying information, taking user input, printing, data storage, and network connectivity, among others. The peripheral devices 310a-c, 312a-b, 320 may communicate with the processors 302, memory subsystem 306, and each other using a bus protocol, such as PCI, SCSI, SATA, PATA, or the like, or using a combination of bus protocols.

In this example, the components of the computing system 200 are connected to each other using a number of busses 316a-h. For example, in this example, the root complex 304 is connected to the switch 308 using Bus 1 316a, the peripheral device 310c using Bus 6 316e, and the bridge 314 using bus 316f. The switch 308 is further connected to the peripheral device 310a using Bus 3 316b, the location-aware peripheral device 320 using Bus 4 316c, and the peripheral device 316b using Bus 5 316d. The bridge 314 may further be connected to the peripheral devices 312a-b using a shared bus, Bus 8 316g. Each of these busses 316a-g may be assigned an identifier, which may be used by the various components to identify their location in the computing system 200. In this example, the busses 316a-g have been assigned numeric identifiers.

Upon powering on in the illustrated computing system 300, the location-aware peripheral device 320 attempts to determine characteristics of the computing system 300. These characteristics may include, for example, the physical components of the computing system 300, the configuration of these components, and/or software being executed by these components. For example, the location-aware peripheral device 320 may attempt to ascertain the number of peripheral devices 310a-c, 312a-b in the computing system 300, where and/or how they are attached to the computing system 300, their functionality and/or capabilities, their configuration, their firmware type and/or version, and/or their manufacturer, and any other information that the peripheral devices 310a-c, 312a-b are capable of providing. The location-aware peripheral device 320 may further examine, for example, the root complex 304 and the switch 308 to determine, for example, how many ports each has, and which or what type of device is connected to each of those ports. The location-aware peripheral device 320 may further attempt to determine other information, such as the type and/or number of processors 302, the size and/or type of memories in the memory subsystem 306, and/or the Basic Input/Output System (BIOS) of the computing system 300, among other things.

The location-aware peripheral device 320 may determine the characteristics of the computing system 300 by exchanging transactions with each component in the computing system 300. For example, the location-aware peripheral device 320 can obtain from the root complex 304 basic information for accessing the other peripheral devices 310*a-c*, 312*a-b*, such as each device's address space or spaces. The location aware peripheral device 320 may then send transactions to each of the peripheral devices 310*a-c*, 312*a-b*, and possibly also the switch 308 and the bridge 314, to obtain information from each device. The location-aware peripheral device 320 may put this information together to determine the characteristics of the computing system 300.

In some implementations, the location-aware peripheral device 320 may be pre-configured with profiles. The profiles describe various computing systems. In some implementations, a profile describes the hardware and/or software configuration of a specified computing system. The profiles may describe a class or type of the computing system (e.g., an Intel®-based system running Linux), or may describe the specific computing system (e.g., one having a certain processor, a certain amount of memory, a specific BIOS version, a specific bus topology, etc.), or some intermediate degree of specificity. The location-aware peripheral device 320 may use the computing system's 300 characteristics to identify a profile from these profiles. For example, the location-aware peripheral device 320 may compare one or more of the characteristics against the profiles. In some cases, a match may be found only if all the characteristics match a profile. In other cases, a near match may be acceptable. In some cases, the profile may specify a range of acceptable values.

As noted, the profiles may be defined generally (e.g., an Intel®-based system, running Linux, operating within a certain Internet Protocol (IP) address range, and located in the state of Washington). Alternatively or additionally, the profile may be specified by a computing system's owner. In some cases, a computing system's owner may know the precise hardware and software configuration of his computing system. In other cases, the computing system's owner may have a good, if not exact, description of his computing system's configuration. In either of these cases, the computing system's owner can supply the computing system's configuration as a profile to load onto the location-aware peripheral device 320. This profile can be loaded onto the location-aware peripheral device 320 at the time the device is manufactured and/or at the time the device is put onto service.

Alternatively or additionally, in some implementations, the location-aware peripheral device 320 may obtain a profile the first time it is powered on in a customer's computing system (that is, the first time it is put into service, as opposed to any time it is powered on during the manufacturer's quality testing). In these implementations, the first time it boots in the customer's computing system, the location-aware peripheral device 320 may obtain the characteristics of the computing system as described above, and may store these characteristics in a non-volatile memory. On each subsequent power-on, the location-aware peripheral device 320 may compare the current characteristics of the computing system against the stored characteristics, to verify that the characteristics of the computing system have not changed, or have not changed outside of acceptable parameters. When the characteristics have changed in an unacceptable manner, the location-aware peripheral device 320 may configure itself accordingly. For example, as described further below, the location-aware peripheral device 320 may configure itself according to a factory configuration; that is, the configuration it had when it left the manufacturing facility.

In some implementations, the profiles may also be used to identify the computing system 300. For example, the profile may include a name assigned to the computing system 300, and/or may include the computing system's 300 physical location (e.g., a server rack slot, a room number, a building number, a street address, etc.). As another example, the profile may include the identity of the owner of the computing system 300. The owner may be an individual person, a network, a business entity, an educational entity, a government entity, or some other entity. When an identity associated with a profile establishes that the computing system is a known computing system, the location-aware peripheral device 320 may configure itself to enable a set of features associated with the known computing system. For example, when the identity of the computing system indicates that the computing system is located in a secure datacenter for Amazon Web Services, the location-aware peripheral device may configure itself to enable all of its features. As another example, when the identity of the computing system indicates that the computing system is located at a local library, the location-aware peripheral device may configure itself to enable a minimum set of features. In contrast, should the location-aware peripheral device determine that its computing system is unknown—that is, its characteristics do not match a profile, or match a profile with no identification information—the location-aware peripheral device may configure itself to disable all of its features.

After attempting to match the characteristics of the computing system 300 against the profiles stored in its memory, the location-aware peripheral device 320 may select a trust level, and, based on the trust level, configure itself. In some cases, the computing system's 300 characteristics may match a particular profile that has been assigned a high-level of trust. A profile may be assigned a high-level of trust, for example, when the profile was specified by the computing system's 300 owner. Based on the high trust level, the location-aware peripheral device 320 may configure itself to enable all of its available features. For example, the location-aware peripheral device 320 may enable its 500 Gigabyte (GB) storage drive with free access to all of the space, as well its 25 Gigabit (Gb) network interface, along with intelligence to monitor classes or types of network traffic.

In other cases, the location-aware peripheral device 320 may find that the characteristics of the computing system 300 match a profile with an intermediate trust level. For example, the matching profile may define a generally acceptable system. In these cases, the location-aware peripheral device 320 may configure itself to enable only a minimum set of features from among all of its available features. For example, the location-aware peripheral device 320 described in the above example may enable its 500 GB storage drive, reserving a 100 GB partition for privileged users, and may further enable its 25 Gb network interface without the network monitoring intelligence. In various implementations, the features enabled may be specified by a configuration that is associated with the matching profile.

In yet other cases, the location-aware peripheral device 320 may find that the characteristics of the computing system 300 match a profile with a low trust level, or nearly but do not precisely match any profile, or do not match any profile at all. In these cases, the location-aware peripheral device 320 may determine that it is in an unsafe environment. For example, it may be that the location-aware peripheral device 320 has been stolen, and has been attached to a thief's computing system. In these cases, the location-aware peripheral device 320 may configure itself to disable all of its available features. The location-aware peripheral device 320 may become essentially unusable. In some implementations, this unusable state may be temporary. For example, should the location-aware peripheral device 320 be returned to a computing system 300 that it recognizes as having an intermediate or high trust level, the location-aware peripheral device 320 may configure itself to once again enable some of its features. Alternatively or additionally, the location-aware peripheral device 320 may be made operational again by supplying it with a security key that has been assigned to its legitimate owner. In some implementations, the unusable state may be permanent. For example, upon powering on in an unfamiliar computing system, the location-aware peripheral device 320 may delete its own firmware. In some implementations, the location-aware peripheral device 320 may even physically destroy itself. Physical destruction of the device may be desirable when, for example, the location-aware peripheral device 320 is an SSD and is storing sensitive information.

Figure 4:
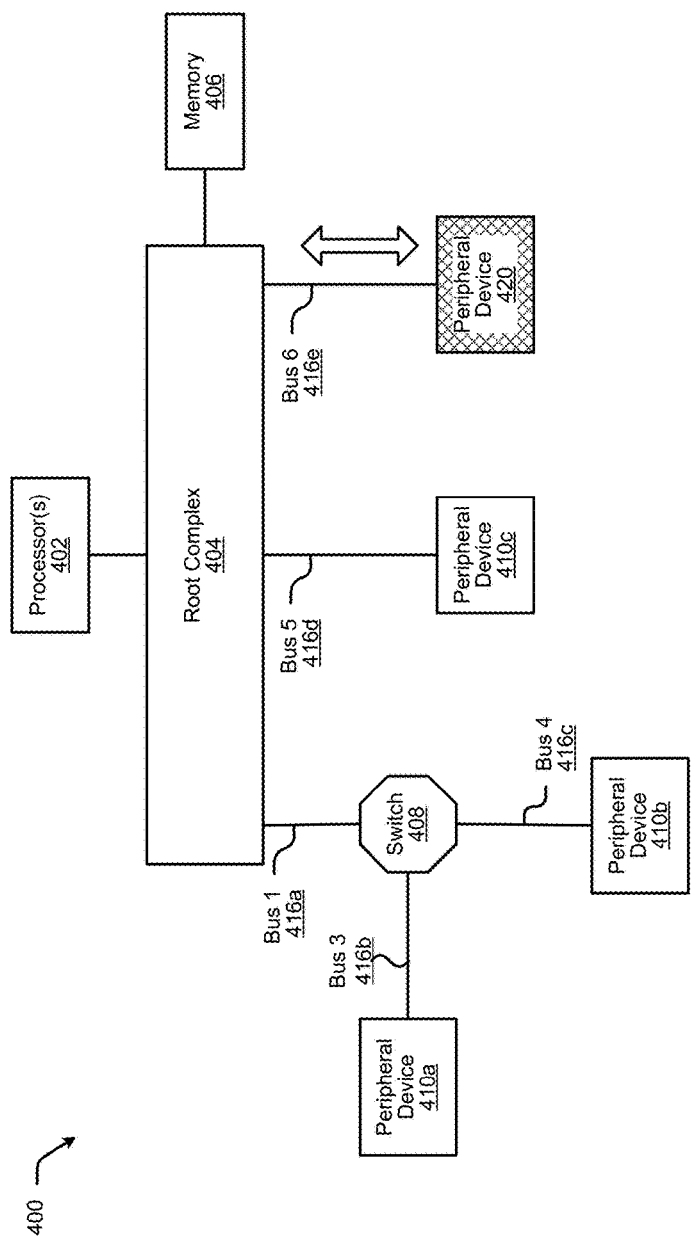
FIG. 4 illustrates an example of a computing system that is different from the computing system illustrated in FIG. 3.

A location-aware, self-configuring peripheral device may be moved from one computing system to another, and thus determines the characteristics of its environment and configures itself each time it is powered on. FIG. 4 illustrates an example of a computing system 400 that is different from the computing system 300 illustrated in FIG. 3. The example computing system 400 of FIG. 4 includes one or more processors 402, a root complex 404, a memory subsystem 406, a switch 408, and a number of peripheral devices 410a-c, including a location-aware, self-configuring peripheral device 420. The processors 402 may be general purpose computing devices capable of executing software code. The root complex 404 may be a hardware and/or software device that connects the processors 402 and memory subsystem 406 to the peripheral devices 410a-c, 420. The memory subsystem 406 may provide temporary or long-term storage for data that may be used by the computing system 400. The peripheral devices 410a-c, 420 may provide the computing system 400 with various input, output, storage, and/or network functionality. The peripheral devices 410a-c, 420 may communicate with the processors 402, memory subsystem 406, and each other using a bus protocol, or a combination of bus protocols. The components of the computing system 400 may be interconnected using a number of busses 416a-e. In this example, the switch 408, one peripheral device 410c, and the location-aware peripheral device 420 are connected to the root complex 404 using busses Bus 1 416a, Bus 5, 416d, and Bus 6 416e, respectively. Furthermore, the peripheral devices 410a, 410b are connected to the switch 408 using busses Bus 3 416b and Bus 4 416c, respectively.

Upon powering on in this example computing system 400, the location-aware peripheral device 420 may configure itself according to the procedure described above. The location-aware peripheral device 420 may first determine the characteristics of the computing system 400, such as the topology of the busses 416a-e and devices 408, 410a-c, 420, the identity, location, and configuration of each of the devices 408, 410a-c, information about the processors 402 and the memory subsystem 406, and any other information that it is able to obtain. In some implementations, the location-aware peripheral device 420 may learn about the other devices 408, 410a-c, 420 by requesting information from the root complex 404. In some implementations, the location-aware peripheral device 420 is able to request information from each of the other devices 408, 410a-c, 420. In some implementations, the location-aware peripheral device 420 shares a bus with the other devices 408, 410a-c, 420, and learns about the other devices 408, 410a-c, 420 from transactions on the shared bus.

Having obtained characteristics of the computing system 400, the location-aware peripheral device 420 may next use the characteristics to identify a profile from among profiles stored in its memory. In some implementations, the location-aware peripheral device 420 may operate on one or more of the characteristics using mathematical and/or logical operations, and use the result to identify a profile. In some implementations, the location-aware peripheral device 420 may compare some or all of the characteristics against information stored in the profiles, and identify the profile with the best match, the nearest match, or a match with an acceptable amount of variance. Based on the identified profile, the location-aware peripheral device 420 may next select a trust level for the computing system 400. The location-aware peripheral device 420 may then configure itself, based on the selected trust level.

In the example of FIG. 4, it may be that the location-aware peripheral device 420 first powered on in the computing system 300 of FIG. 3, and now has powered on in the computing system 400 of FIG. 4. In some implementations, the location-aware peripheral device 420 may be configured to not keep track of where it has been before. In these implementations, the location-aware peripheral device 420 may configure itself according to the new location it finds itself in.

In some implementations, the location-aware peripheral device 420 may be configured to store information about computing systems it has powered up in before. For example, the location-aware peripheral device 420 may have first powered on in the computing system 300 of FIG. 3. The location-aware peripheral device 420 may further have determined that the computing system 300 was highly-trusted, and thus have configured itself to enable all of its available features. The location-aware peripheral device 420 may subsequently have been removed from the computing system 300, and been installed in the computing system 400 of FIG. 4. In some implementations, the location-aware peripheral device 420 may be configured to maintain its prior configuration; that is, though the computing system 400 may have an intermediate trust level, the location-aware peripheral device 420 may have configured itself to enable all of its features. This example illustrates that the configuration that the location-aware peripheral device 420 uses may be determined by the first system that the location-aware peripheral device 420 boots up in. Thus, for example, when the location-aware peripheral device 420 first boots in a moderately trusted computing system, it may configure itself with a minimum set of features even when it subsequently boots in a highly-trusted systems.

In some implementations, the location-aware peripheral device 420 may configure itself differently for different systems, but retain information specific to each system. For example, the location-aware peripheral device 420 may be a hard drive, such as a magnetic drive, a flash drive, a solid state drive, or some other device with persistent memory. Assuming the location-aware peripheral device 420 first boots up in the computing system 300 of FIG. 3, the location-aware peripheral device 420 may provide users of the computing system 300 a certain amount of storage space and access privileges. When the location-aware peripheral device 420 subsequently boots up in the computing system 400 of FIG. 4, it may provide users of the computing system 400 with some storage space, but leave the storage space provided to the first computing system 300 unavailable and inaccessible. Should the location-aware peripheral device 420 be moved back to the first computing system 300, users of the computing system 300 may find their storage space available and unchanged.

In any of the implementations described above, the location-aware peripheral device 420 may disable or reset itself should it determine that the computing system 400 has a low trust level, which may be the case when the computing system 400 cannot be recognized at all. Disabling may mean that the location-aware peripheral device 420 refuses to boot, or is able to boot and is visible as a device but does not respond to any commands. The location-aware peripheral device 420 may be disabled only temporarily. For example, it may be that the computing system's 400 characteristics match a profile, but that one key characteristic (for example, the BIOS version) does not. The location-aware peripheral device 420 may thus configure itself to disable all its features, but once the problematic characteristic is fixed (for example, the BIOS is upgraded), on the next power on, the location-aware peripheral device 420 may configure itself with its appropriate features enabled.

In various implementations, location-aware peripheral device 420 may be re-enabled in other ways. For example, the location-aware peripheral device 420 may be re-enabled with a security key that is assigned to the rightful owner. Alternatively or additionally, the location-aware peripheral device 420 may be updated with new profiles; for example, an owner may request updated profiles from the location-aware peripheral device's 420 manufacturer.

In some implementations, the location-aware peripheral device 420 may permanently disable itself. To permanently disable itself, the location-aware peripheral device 420 may, for example, delete its own firmware, or may break a critical circuit that renders the device inoperative. In some implementations, the location-aware peripheral device 420 may disable itself more drastically. For example, the location-aware peripheral device 420 may purposefully overheat and cause itself irreparable, physical damage. Permanently and irreparably destroying the location-aware peripheral device 420 may be a threat deterrent, and/or a way to ensure that sensitive information is destroyed.

In some implementations, as an alternative to permanently disabling itself, the location-aware peripheral device 420 may instead reset itself. For example, in some implementations, upon powering on in a computing system 400 with a low trust level, the location-aware peripheral device 420 may configure itself to enable a set of features associated with a factory configuration. The factory configuration is the configuration the location-aware peripheral device 420 had when it left the factory and before it was received by an end consumer. Resetting to factory configuration may cause the location-aware peripheral device 420 to lose any configuration and/or data that it contained as a result of being used in the computing system 400. For example, resetting to a factory configuration may include deleting and/or reformatting any persistent memory that the location-aware peripheral device 420 includes.

Figure 5:
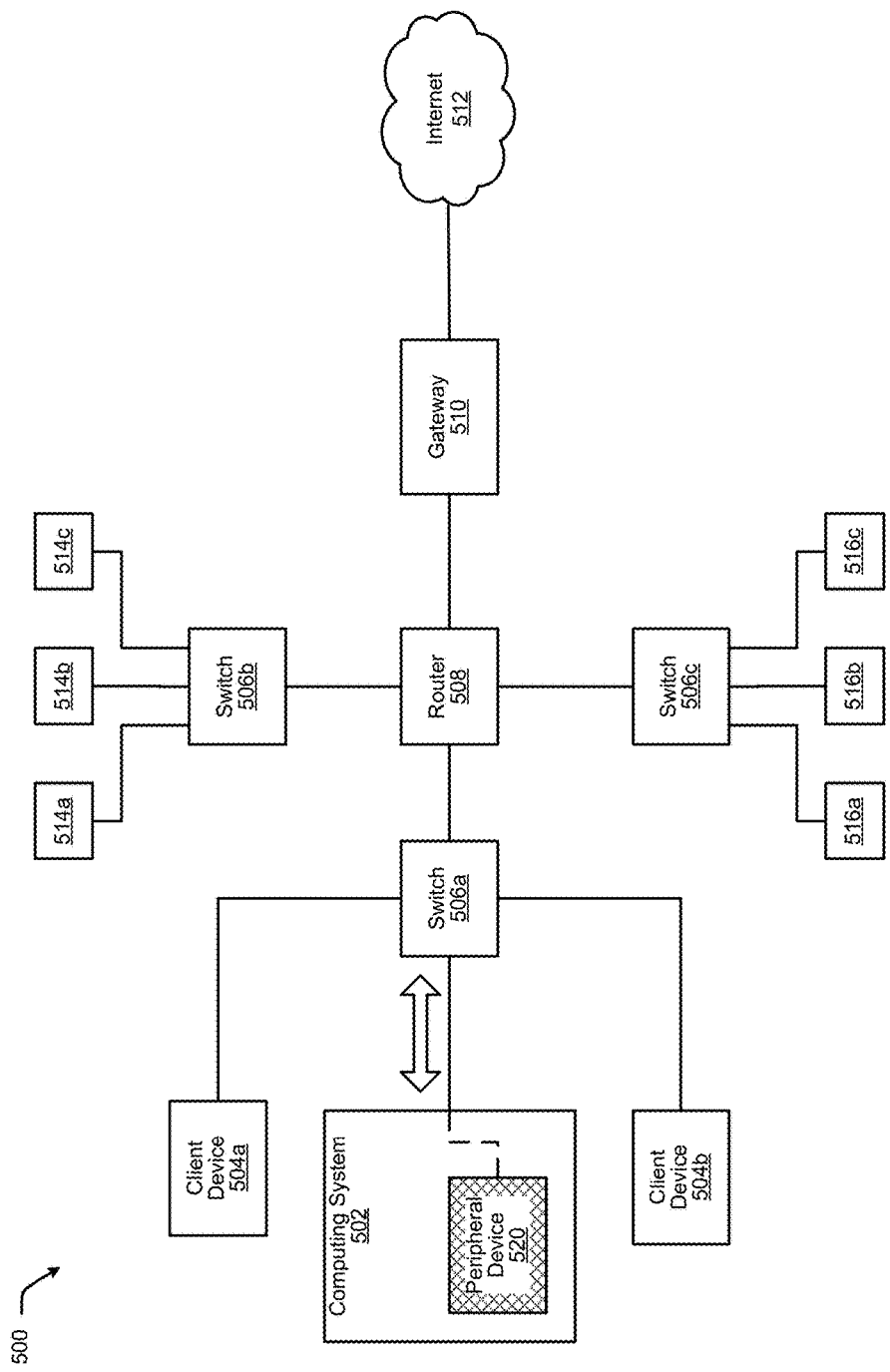
FIG. 5 illustrates an example of a network that includes a computing system configured to include a location-aware, self-configuring peripheral device.

Computing systems are often connected to a network. The computing system's network environment may also provide characteristics that describe the computing system. FIG. 5 illustrates an example of a network 500 that includes a computing system 502 configured to include a location-aware, self-configuring peripheral device 520. The illustrated example network 500 includes a switch 506a that the computing system uses to connect to the network 500. Additional client devices 504a-b (e.g., users' computers or devices and printers) may also be connected to the switch 506a. The switch 506a may be connected to a router 508.

Additional switches 506b-c may also be connected to the router 508. The first switch 506b may connect an additional group of devices 514a-c (e.g., a group of servers) to the network. The second switch 506c may connect another group of devices 516a-c (e.g., a storage array) to the network. The router 508 may also be connected to a gateway 510, which may provide connectivity with the Internet 512.

The network environment of the computing system 502 can form part of the characteristics of the computing system 502, and can be used by the location-aware peripheral device 520 to configure itself. For example, the network environment in the illustrated example can be described as having three switches 506a-c connected to a single router 508, which itself is connected to a single gateway 510. The network environment can further include the IP and/or Media Access Control (MAC) addresses of each of the devices in the network, and other identification information for each device, such as the device's manufacturer. The network environment can further include the configuration of each device, including, for example the number of ports each device has, what type of device is connected to each port, and so on.

As with the computing system 502 itself, the characteristics of the network environment can be used to create a profile describing the computing system 502. The network characteristics may be used in addition to, or instead of, the characteristics of the computing system 502. In some cases, the profile may describe the network 500 in general terms (for example, a network including three user computers, three switches, and a router, and using a specific IP address range). In other cases, the profile may be a specified network owner. Often, a network owner has a manifest describing each piece of hardware in its network, the arrangement of the hardware in the network, and the configuration of each piece of hardware. In other cases, the network owner has a detailed, if not exact, description of the hardware and software configuration of its network. The network owner, in any of these cases, can use the description of its network as a profile stored on the location-aware peripheral device 520. Upon powering on in the computing system 502, the location-aware peripheral device 520 can thus identify that it is in the network 500.

The location-aware peripheral device 520 may determine the characteristics of the network by issuing packets to the various devices in the network 500. For example, in some implementations, the location-aware peripheral device 520 includes a network interface. In these implementations, the location-aware peripheral device 520 may transmit packets through its network interface to the various devices in the network 500. Using these packets, the location-aware peripheral device 520 can request information from each device in the network, information such as for example IP and/or MAC addresses, port numbers, routing tables, and so on.

In some implementations, the location-aware peripheral device 520 may not have a network interface (for example, it may be a hard drive). The computing system 502 may, instead, have a separate network interface card. In these implementations, the location-aware peripheral device 520 may determine characteristics of the network environment by interacting with the network interface card. The location-aware peripheral device 520 may send transactions to the network interface card, which may then send packets that request the information sought by the location-aware peripheral device 520.

In some implementations, the location-aware peripheral device 520 may be configured to search the network 500 for a verification server. The verification server may be at a designated location in the network 500. When it finds a verification server, the location-aware peripheral device 520 may request that the verification server verify the trust level of the network 500. The verification server may respond that the network 500 has a high trust level, in which case the location-aware peripheral device 520 may configure itself to enable all of its features. Alternatively, the verification server may respond that the network 500 has an intermediate trust level, and the location-aware peripheral device 520 may subsequently configure itself with a minimum set of features.

In some implementations, instead of providing a trust level, the verification server may provide an identity of the network 500. For example, the verification server may provide information identifying the owner of the network 500, a domain name of the network, and/or a physical location of the network 500. The location-aware peripheral device 520 may then use the identity of the network 500 to determine its configuration.

In some implementations, the exchange between the location-aware peripheral device 520 and the verification server may include a higher degree of security. For example, the location-aware peripheral device 520 may include a Trusted Platform Module (TPM). TPM describes a type of secure cryptoprocessor that can store cryptographic keys for protecting information. The location-aware peripheral device 520 may be configured to exchange security certificates with the verification server, to verify the trust level of the network 500. When the verification server is able to certify the trust level and/or identity of the network 500, then the location-aware peripheral device 520 may configure itself to enable all of its features. When the verification server is not able to certify the network, the location-aware peripheral device 520 may disable itself.

In some cases, the location-aware peripheral device 520 may not find a verification server in the network 500. In these cases, the location-aware peripheral device 520 may either configure itself to enable a minimum set of features, or may disable itself.

As discussed above, a location-aware peripheral device may configure itself with no features enabled whenever it determines that it is in a computing system that is untrusted. It may be the case, however, that the computing system is trusted, but finds itself in a foreign network. For example, the computing system 502 may have been stolen, and subsequently powered on in the illustrated network 500. As discussed above, in some implementations, the location-aware peripheral device 520 may be configured to include characteristics of the network environment in determining how to configure itself. In these implementations, location-aware peripheral device 520 may at least disable itself. For example, when the location-aware peripheral device 520 provides a network interface, disabling the network interface means the computing system 502 cannot communicate with the network 500. This may not render the computing system 502 inoperative, since the thief can replace the location-aware peripheral device 520 with another network interface device. The location-aware peripheral device 520, however, may operate as a theft deterrent.

As a theft deterrent, configuring the location-aware peripheral device 520 to physically self-destruct may be desirable. For example, the location-aware peripheral device 520 may damage the computing system 502 in the process of self-destructing. Physical self destruction may also be a good theft deterrent for certain types of location-aware peripheral devices 520. For example, when the location-aware peripheral device 520 is a hard drive or other persistent memory device, it may be desirable to configure the location-aware peripheral device 520 to destroy itself thoroughly, so that no data can be retrieved from its disks.

Figure 6:
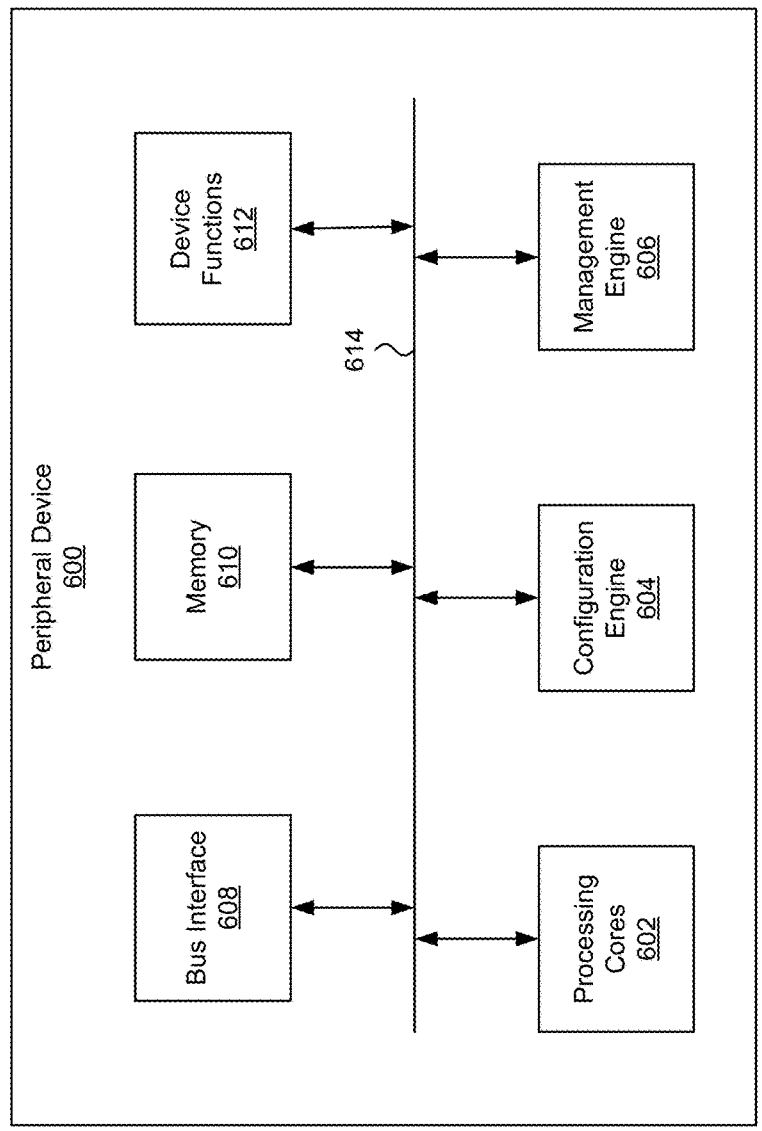
FIG. 6 illustrates an example of a location-aware, self-configuring peripheral device.

FIG. 6 illustrates an example of a location-aware, self-configuring peripheral device 600. Functionality and/or several components of the location-aware peripheral device 600 may be used without limitation with other embodiments disclosed elsewhere in this disclosure, without limitations. In some implementations, a location-aware peripheral device 600 may facilitate processing of packets and/or forwarding of packets from the location-aware peripheral device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the location-aware peripheral device 600 may be the recipient and/or generator of packets. In some implementations, the location-aware peripheral device 600 may modify the contents of the packet before forwarding the packet to another device. The location-aware peripheral device 600 may be a peripheral device coupled to another computer device, a switch, a router or any other suitable device enabled for receiving and forwarding packets.

In one example, the location-aware peripheral device 600 may include processing logic 602, a configuration module 604, a management module 606, a bus interface module 608, memory 610, and a device functions module 612. These modules may be hardware modules, software modules, or a combination of hardware and software. In certain instances, modules may be interchangeably used with components or engines, without deviating from the scope of the disclosure. The location-aware peripheral device 600 may include additional modules, not illustrated here, such as components discussed with respect to the nodes disclosed in FIG. 8. In some implementations, the location-aware peripheral device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, magnetic memory, optical memory, solid state memory, and/or some other suitable storage media. In some cases, some or all of the memory 610 may be internal to the location-aware peripheral device 600, while in other cases some or all of the memory may be external to the location-aware peripheral device 600. The memory 610 may store an operating system comprising executable instructions that, when executed by the processing logic 602, provides the execution environment for executing instructions providing the functionality for the location-aware peripheral device 600. The memory 610 may also store and maintain data structures and, for example, routing tables for facilitating the functionality of the location-aware peripheral device 600. In some implementations, the memory 610 may store profiles describing a hardware and/or software configuration for a computing system. In some implementations, the memory 610 may store one or more descriptions of operating parameters that are acceptable for a computing system.

In some implementations, the configuration module 604 may include one or more configuration registers. Configuration registers may control the operations of the location-aware peripheral device 600. In some implementations, one or more bits in the configuration register can represent certain capabilities of the location-aware peripheral device 600. Configuration registers may be programmed by instructions executing in the processing logic 602, and/or by an external entity, such as a host device, an operating system executing on a host device, and/or a remote device. The configuration module 604 may further include hardware and/or software that control the operations of the location-aware peripheral device 600. For example, in some implementations, the configuration module 604 may be configured to enable or disable one or more operations of the location-aware peripheral device 600 based on instructions from the processing logic 602 and/or the device functions 612. For example, the configuration module 604 may enable or disable one or more of the device functions 612, and/or another operation of the location-aware peripheral device 600.

In some implementations, the management module 606 may be configured to manage different components of the location-aware peripheral device 600. In some cases, the management module 606 may configure one or more bits in one or more configuration registers at power up, to enable or disable certain capabilities of the location-aware peripheral device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the location-aware peripheral device 600 may include multiple bus interface modules for communicating with multiple external entities. These multiple bus interface modules may implement the same local bus protocol, different local bus protocols, or a combination of the same and different bus protocols.

The device functions 612 may include hardware and/or software for implementing features available to the location-aware peripheral device 600. In some implementations, the device functions 612 may include logic to implement an examination engine for examining characteristics of other devices and determining a status for an attached computing system. In some implementations, the device functions 612 may include hardware and/or software configured to implement functionality provided directly by the peripheral device 600. For example, the device functions 612 may include hardware and/or software configured to implement a security co-processor or a solid state hard drive.

In some implementations, the device functions 612 may include hardware and/or software configured to implement a protocol for communicating with externally connected devices or functions. For example, the device functions 612 may include hardware and/or software for communicating with a network. This device functions 612 may, for example, include physical connectors or physical ports for wired connection to a network, and/or antennas for wireless communication to a network. The device functions 612 may further include hardware and/or software configured to implement a network protocol stack. The device functions 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the location-aware peripheral device 600 may include multiple network interface modules, each configured to communicate with a different network. For example, in these implementations, the location-aware peripheral device 600 may include a device functions for communicating with a wired Ethernet network, a wireless 802.11 network, a cellular network, an Infiniband network, etc.

In some implementations, the location-aware peripheral device 600 may include multiple device functions, each configured to provide different functionality. For example, in these implementations, the location-aware peripheral device

600 may include a device function for communicating with a wired Ethernet network, device functions for communicating with a wireless 802.11 network, and device functions providing a storage array.

In some implementations, the location-aware peripheral device 600 is a PCI-based device. In these implementations, the location-aware peripheral device 600 includes a PCI interface for communicating with a host device. The term "PCI" may be used to describe any protocol in the PCI family of bus protocols, including the original PCI standard, PCI-X, AGP, and PCIe. The PCI protocols are standard bus protocols for connecting local peripheral devices to host devices. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the location-aware peripheral device 600 may be connected to a computing system using a PCIe interface.

A PCI-based device may include one or more functions. A "function" describes operations that may be provided by the location-aware peripheral device 600. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources. In some implementations, a PCI device may have up to eight functions.

In some implementations, the location-aware peripheral device 600 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of a SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

The various components and modules of the location-aware peripheral device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

II. Methods

Figure 7:
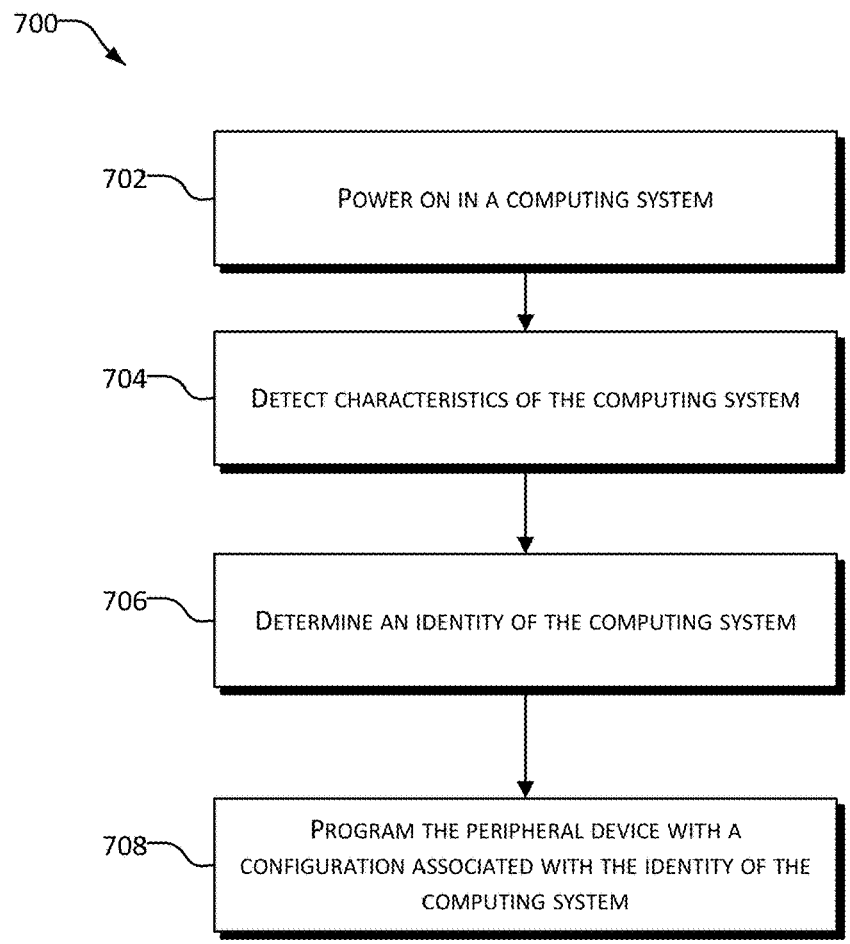
FIG. 7 illustrates an example of a process for configuring a peripheral device according to an identity of a computing system.

FIG. 7 illustrates an example of a process 700 for configuring a peripheral device according an identity of a computing system. The example process 700 may be implemented by a location-aware, self-configuring peripheral device, such as is described with respect to FIGS. 2-5.

In the example process 700 of FIG. 7, at step 702, the peripheral device powers on in a computing system. Upon powering on, the peripheral device may next, at step 704, detect characteristics of the computing system. The characteristics of the computing system may include, for example, the hardware components of the computing system, the configuration of these components, and/or software being executed by these components. Alternatively or additionally, the characteristics of the computing system may include characteristics of the computing system's network environment. For example, the characteristics may include the topology of a network that includes the computing system, the configuration of devices in the network, IP and MAC addresses, and so on. The peripheral device may have a bus interface that communicatively couples it to the computing system. The peripheral device may use this bus interface to detect the characteristics of the computing system.

Having detected characteristics of the computing system, the peripheral device may next, at step 706, attempt to determine an identity of the computing system. To determine the identity of the computing system, the peripheral device may use the characteristics detected at step 704 to identify a profile from among profiles stored on the peripheral device. The profiles may describe computing systems in general terms, or may describe specific computing systems. The profiles may include identification information. For example, a profile may include information describing an owner of the computing system, and/or the physical location of the computing system. In some cases, the peripheral device may not have a profile that matches the detected characteristics.

At step 708, the peripheral device may next program itself with a configuration associated with the identity of the computing system. In some cases, determining the identity of the computing system may establish that the computing system is a known computing system. The known computing system may be associated with a set of features from among the peripheral device's available features. The peripheral device may thus configure itself to enable just these features. In some cases, determining the identity of the computing system may establish that the computing system is an unknown computing system. In these cases, the peripheral device may disable all of its available features.

III. Computing Systems

Figure 8:
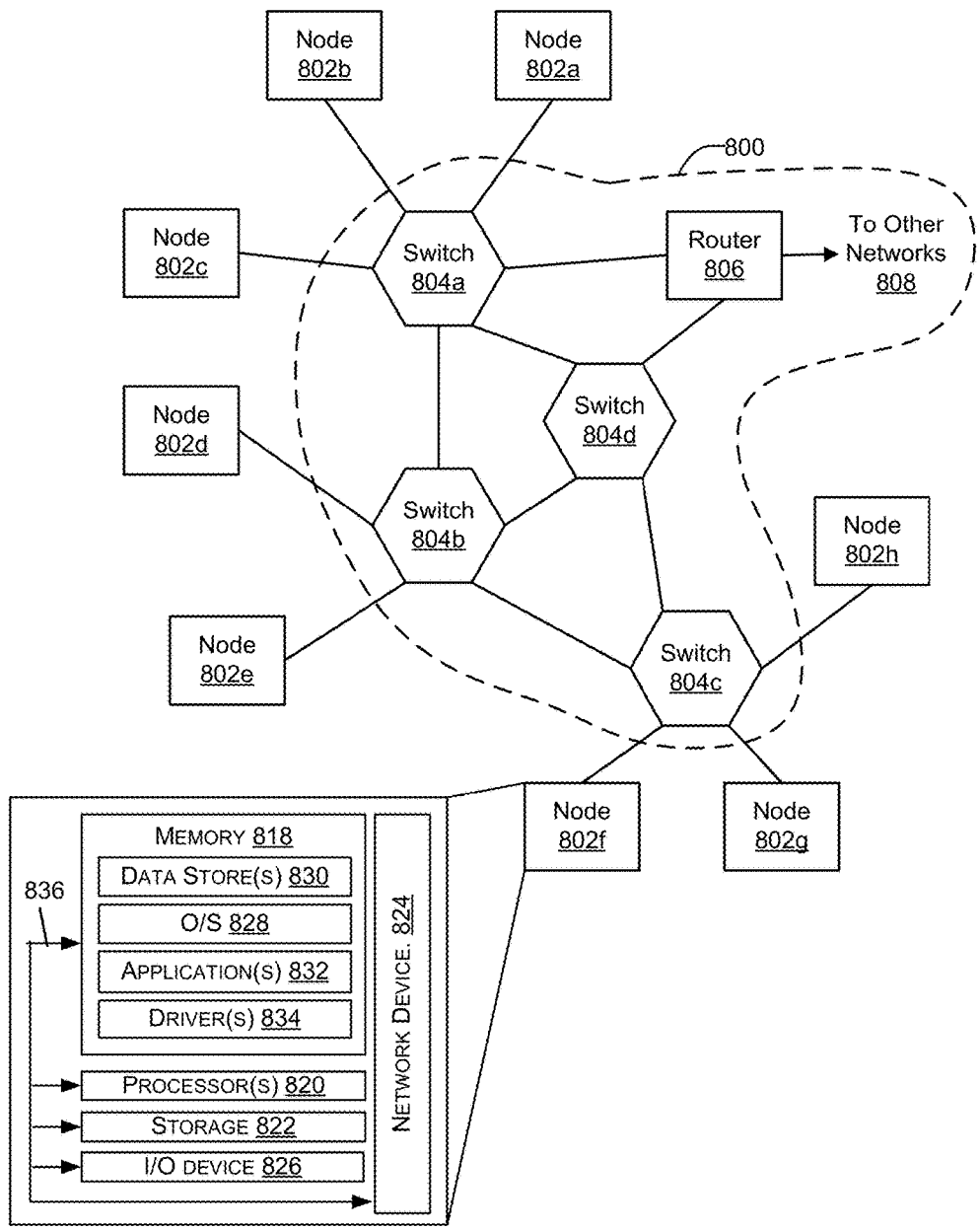
FIG. 8 illustrates an example architecture for features and systems described herein that includes one or more service provider computers and/or a user device connected via one or more networks, according to some embodiments.

FIG. 8 illustrates a network 800, illustrating various different types of network devices, such as nodes comprising the network device, switches and routers. One or more of the network devices illustrated in FIG. 8 may include the location-aware peripheral device 600 of FIG. 6, or may incorporate the functionality of a location-aware peripheral device. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the location-aware peripheral device 600 of FIG. 6.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the network device 824 may include bus interface module that implements NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Peripheral Component Interconnect (PCI)-based peripheral device, comprising:
   a PCI-based bus interface configured to connect the PCI-based peripheral device to a PCI-based bus in a computing system;
   a memory storing profiles, each profile describing a computing system configuration for a pre-determined computing system, wherein each profile is associated with a trust level from a plurality of trust levels, and wherein each trust level is associated with a device configuration for the PCI-based peripheral device;
   a detection engine configured to, upon powering on in a particular computing system, detect characteristics of the particular computing system using the PCI-based bus interface, the characteristics including physical components of the particular computing system, a configuration of the physical components of the particular computing system, or a network environment of the particular computing system;
   a selection engine configured to select a particular profile from the profiles, wherein selecting the particular profile includes determining that the characteristics correspond to a computing system configuration described by the particular profile, and wherein the particular profile is associated with a particular trust level; and
   a programming engine configured to program the PCI-based peripheral device using a particular device configuration associated with the particular trust level, wherein using the particular device configuration programs a set of features for the PCI-based peripheral device by programming one or more hardware configuration registers of the PCI-based peripheral device, wherein programming the set of features completes before the particular computing system conducts device discovery operations to discover the PCI-based peripheral device, and wherein device discovery operations include scanning of the PCI-based bus to locate the PCI-based peripheral device.

2. The PCI-based peripheral device of claim 1, further comprising:
   a network interface, wherein the detection engine is configured to, upon powering on in the particular computing system, detect additional characteristics of the particular computing system using the network interface, and wherein detecting the additional characteristics includes sending packets using the network interface and receiving responses to the packets over the network interface.

3. The PCI-based peripheral device of claim 1, further comprising:
an identification engine, wherein the identification engine is configured to use the particular profile to determine an identity of the particular computing system.

4. The PCI-based peripheral device of claim 1, wherein the programming engine is configured to, based on the particular trust level, program the PCI-based peripheral device to disable the PCI-based peripheral device.

5. The PCI-based peripheral device of claim 1, wherein the peripheral device includes persistent memory.

6. The PCI-based peripheral device of claim 5, wherein the persistent memory is solid state memory, magnetic memory, or flash memory.

7. A peripheral device, comprising:
a memory storing profiles, wherein each profile describes a computing system configuration for a pre-determined computing system, wherein each profile is associated with a trust level, and wherein the trust level is associated with a device configuration for the peripheral device;
an interface configured to communicatively couple the peripheral device to a particular computing system; and
a configuration engine operable to:
when the peripheral device powers on in the particular computing system, determine a set of characteristics of the particular computing system, wherein the set of characteristics describe a configuration of the particular computing system;
select a particular profile from the profiles, wherein selecting the particular profile includes determining that the set of characteristics correspond to a computing system configuration described by the particular profile, and wherein the particular profile is associated with a particular trust level from a plurality of trust levels; and
self-configure the peripheral device according to a particular device configuration associated with the particular trust level, wherein self-configuring includes programming a function of the peripheral device according to the particular device configuration, wherein programming the function completes before the particular computing system conducts device discovery operations to discover the peripheral device, and wherein device discovery including scanning a bus of the particular computing system to locate the peripheral device.

8. The peripheral device of claim 7, wherein the particular trust level is an intermediate trust level, and wherein a device configuration associated with the intermediate trust level programs the peripheral device with a configuration that enables a subset of features of the peripheral device.

9. The peripheral device of claim 7, wherein the particular trust level is a high trust level, and wherein a device configuration associated with the high trust level programs the peripheral device with a configuration that enables all features of the peripheral device.

10. The peripheral device of claim 7, wherein the particular trust level is a low trust level, and wherein a device configuration associated with the low trust level programs the peripheral device with a configuration that disables one or more features of the peripheral device.

11. The peripheral device of claim 7, wherein the configuration engine is further operable to:
send a transaction through the interface; and
receive a response through the interface, the response including a characteristic from the set of characteristics, wherein the characteristic describes a component of the particular computing system or a configuration of the particular computing system.

12. The peripheral device of claim 7, wherein the configuration engine is further operable to:
cause a transaction to be sent to a network interface configured to connect the particular computing system to a network, wherein the network interface is included in the particular computing system; and
receive a response from the network interface, the response including a characteristic from the set of characteristics, the characteristic providing information about a network environment of the particular computing system.

13. The peripheral device of claim 12, wherein peripheral device includes the network interface.

14. The peripheral device of claim 7, wherein the configuration engine is further operable to:
determine that the particular computing system is connected to a network;
search for a verification server on the network; and
upon finding a verification server on the network, request a characteristic from the set of characteristics from the verification server, the characteristic providing verification information.

15. The peripheral device of claim 7, wherein the configuration engine is further operable to:
store the set of characteristics; and
upon powering on again in the particular computing system:
determine an additional characteristic of the particular computing system; and
compare the additional characteristic to the previously stored set of characteristics to determine whether the peripheral device has been communicatively coupled to a different computing system, wherein the configuration engine is further configured to select a profile from the profiles using a result of the comparison.

16. The peripheral device of claim 7, wherein the configuration engine comprises an integrated circuit.

17. The peripheral device of claim 7, wherein the configuration engine comprises firmware stored on the peripheral device, the peripheral device further comprising an integrated circuit configured to execute the firmware.

18. The peripheral device of claim 7, wherein the function of the peripheral device is one or more of a network interface card, a hard drive, a general purpose processing device, or a programmable device.

19. A method, comprising:
upon powering on in a particular computing system:
determining, by a peripheral device, a set of characteristics of the particular computing system, the peripheral device including an interface configured to communicatively couple the peripheral device to the particular computing system;
determining that the set of characteristics correspond to a computing system configuration described by a particular profile from among profiles stored on the peripheral device, wherein each of the profiles is associated with identification information identifying a computing system described by a respective computing system configuration from a plurality of computing system configurations, and wherein identification information associated with the particular profile provides an identity of the particular computing system;

determining, by the peripheral device, a device configuration for the peripheral device, wherein the device configuration is determined using the identity of the particular computing system; and programming, by the peripheral device, the peripheral device with the device configuration, wherein the device configuration controls functionality of a feature of the peripheral device, wherein programming the peripheral device completes before the particular computing system conducts device discovery operations to discovery the peripheral device, and wherein device discovery operations include scanning a bus of the particular computing system to locate the peripheral device.

20. The method of claim 19, wherein the identity of the particular computing system corresponds to a known computing system, and wherein the device configuration enables a feature associated with the known computing system.

21. The method of claim 19, wherein the identity of the particular computing system corresponds to an unknown computing system, and wherein the device configuration disables one or more features of the peripheral device.

22. The method of claim 19, wherein the identity of the particular computing system corresponds to an unknown computing system, and wherein the device configuration enables a feature associated with a factory configuration for the peripheral device.

23. The method of claim 19, further comprising:
transmitting a transaction over the interface of the peripheral device to a component of the particular computing system; and
receiving a response to the transaction over the interface, the response including a characteristic from the set of characteristics.

24. The method of claim 19, further comprising:
transmitting a transaction to a network interface configured to connect the particular computing system to a network, wherein the network interface is included in the peripheral device; and
receiving a response to the transaction over the network interface, the response including a characteristics from the set of characteristics.

25. The method of claim 19, wherein the identity of the particular computing system includes one of an owner of the particular computing system, a network that includes the particular computing system, or a physical location of the particular computing system.

* * * * *